(12) United States Patent
Benjamin et al.

(10) Patent No.: US 10,795,109 B2
(45) Date of Patent: Oct. 6, 2020

(54) EXCESS OPTICAL FIBER DEPLOYMENT CONTROL

(71) Applicant: Halliburton Energy Services, Inc., Houston, TX (US)

(72) Inventors: Seldon David Benjamin, Spring, TX (US); Jason Edward Therrien, Cypress, TX (US); Mikko Jaaskelainen, Katy, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 16/316,338

(22) PCT Filed: Sep. 8, 2016

(86) PCT No.: PCT/US2016/050779
§ 371 (c)(1),
(2) Date: Jan. 8, 2019

(87) PCT Pub. No.: WO2018/048408
PCT Pub. Date: Mar. 15, 2018

(65) Prior Publication Data
US 2019/0293894 A1 Sep. 26, 2019

(51) Int. Cl.
*G02B 6/50* (2006.01)
*E21B 17/20* (2006.01)
(Continued)

(52) U.S. Cl.
CPC ........... *G02B 6/502* (2013.01); *E21B 17/206* (2013.01); *E21B 19/008* (2013.01);
(Continued)

(58) Field of Classification Search
CPC .................................. G02B 6/50; E21B 17/20
(Continued)

(56) References Cited

U.S. PATENT DOCUMENTS

| 4,028,081 | A | * | 6/1977 | Marcatili | ............. C03B 37/022 |
| | | | | | 65/392 |
| 4,135,869 | A | | 1/1979 | Loyer | |

(Continued)

FOREIGN PATENT DOCUMENTS

| EP | 1390789 | 3/2014 |
| KR | 20150054806 | 5/2015 |

OTHER PUBLICATIONS

International Search Report and Written Opinion of PCT Application No. OPCT/US2016/050779 dated Feb. 27, 2017: pp. 1-12.
(Continued)

*Primary Examiner* — Kaveh C Kianni
(74) *Attorney, Agent, or Firm* — Chamberlain Hrdlicka

(57) ABSTRACT

Various embodiments include methods and apparatus structured to increase efficiencies of a drilling operation. These efficiencies may be realized with a fiber cable located in a wellbore at a well site, where the fiber cable can include an optical fiber disposed as a single handed helix in the fiber cable, where the optical fiber is disposed in the cable without having helix hand reversal. Construction of such fiber cables may include applying a twist to the optical fiber during insertion of the optical fiber into the fiber cable in a tubing process in which control of an amount of the twist to form a portion of the optical fiber can control excess fiber length in the tube. Additional apparatus, systems, and methods can be implemented in a variety of applications.

11 Claims, 12 Drawing Sheets

(51) Int. Cl.
  *E21B 19/00* (2006.01)
  *E21B 19/084* (2006.01)
  *E21B 47/00* (2012.01)
  *G02B 6/44* (2006.01)
  *E21B 43/24* (2006.01)

(52) U.S. Cl.
  CPC ............ *E21B 19/084* (2013.01); *E21B 47/00* (2013.01); *G02B 6/44* (2013.01); *G02B 6/4428* (2013.01); *G02B 6/4478* (2013.01); *G02B 6/4488* (2013.01); *E21B 43/2406* (2013.01)

(58) Field of Classification Search
  USPC .......................................................... 385/12
  See application file for complete search history.

(56) References Cited

U.S. PATENT DOCUMENTS

| | | | | |
|---|---|---|---|---|
| 4,146,302 A | * | 3/1979 | Jachimowicz | G02B 6/4403 156/173 |
| 4,640,576 A | * | 2/1987 | Eastwood | G02B 6/4485 226/7 |
| 4,759,602 A | * | 7/1988 | Pascher | G02B 6/4479 385/111 |
| 4,949,038 A | * | 8/1990 | Birch | C03B 37/027 250/227.17 |
| 4,983,333 A | | 1/1991 | Blew | |
| 5,212,755 A | * | 5/1993 | Holmberg | G02B 6/4429 385/104 |
| 5,226,271 A | * | 7/1993 | Karhu | H01B 13/025 57/293 |
| 5,390,273 A | * | 2/1995 | Rahman | G02B 6/4403 385/112 |
| 6,089,546 A | * | 7/2000 | Griffioen | G02B 6/4464 254/134.4 |
| 6,706,348 B2 | * | 3/2004 | Quigley | B29C 70/086 428/36.3 |
| 7,706,651 B2 | | 4/2010 | Park | |
| 7,792,405 B2 | * | 9/2010 | Stoesz | G02B 6/02209 385/100 |
| 8,276,883 B2 | | 10/2012 | Heatley et al. | |
| 8,888,033 B2 | | 11/2014 | Hiebenthal | |
| 2002/0007945 A1 | * | 1/2002 | Neuroth | E21B 17/20 166/66 |
| 2002/0018212 A1 | * | 2/2002 | Bennett | G01R 15/246 356/483 |
| 2002/0088931 A1 | * | 7/2002 | Danisch | G01D 5/268 250/227.14 |
| 2005/0279511 A1 | | 12/2005 | Adnan et al. | |
| 2006/0147164 A1 | * | 7/2006 | Bau | G02B 6/4484 385/111 |
| 2006/0153510 A1 | * | 7/2006 | Kim | G02B 6/4429 385/113 |
| 2012/0068086 A1 | * | 3/2012 | DeWitt | E21B 7/14 250/492.1 |
| 2013/0004135 A1 | * | 1/2013 | Bigot-Astruc | G02B 6/0288 385/126 |
| 2013/0098528 A1 | | 4/2013 | Dowd et al. | |
| 2013/0142491 A1 | * | 6/2013 | Ruzzier | G01M 11/088 385/100 |
| 2015/0141854 A1 | * | 5/2015 | Eberle | A61B 5/02154 600/488 |
| 2015/0378124 A1 | | 12/2015 | Michaelis et al. | |
| 2016/0090832 A1 | | 3/2016 | Mock | |
| 2018/0059352 A1 | * | 3/2018 | Wells | G02B 6/4455 |

OTHER PUBLICATIONS

Goriely et al., "Spontaneous Helix Hand Reversal and Tendril Perversion in Climbing Plants," Physical Review Letters, Feb. 1998, vol. 80(7): pp. 1564-1567.

* cited by examiner

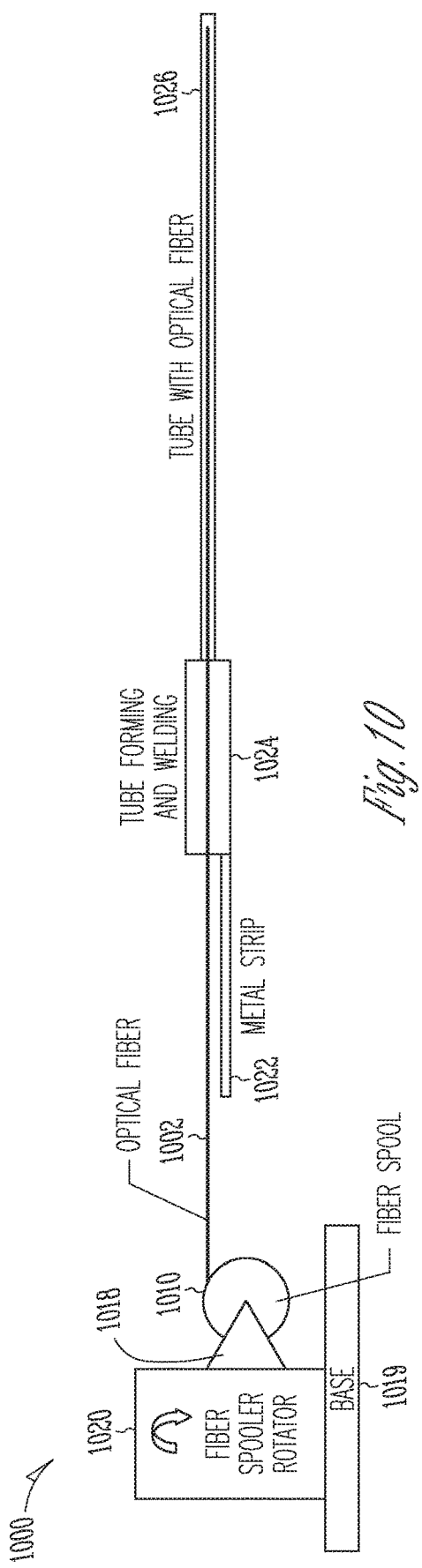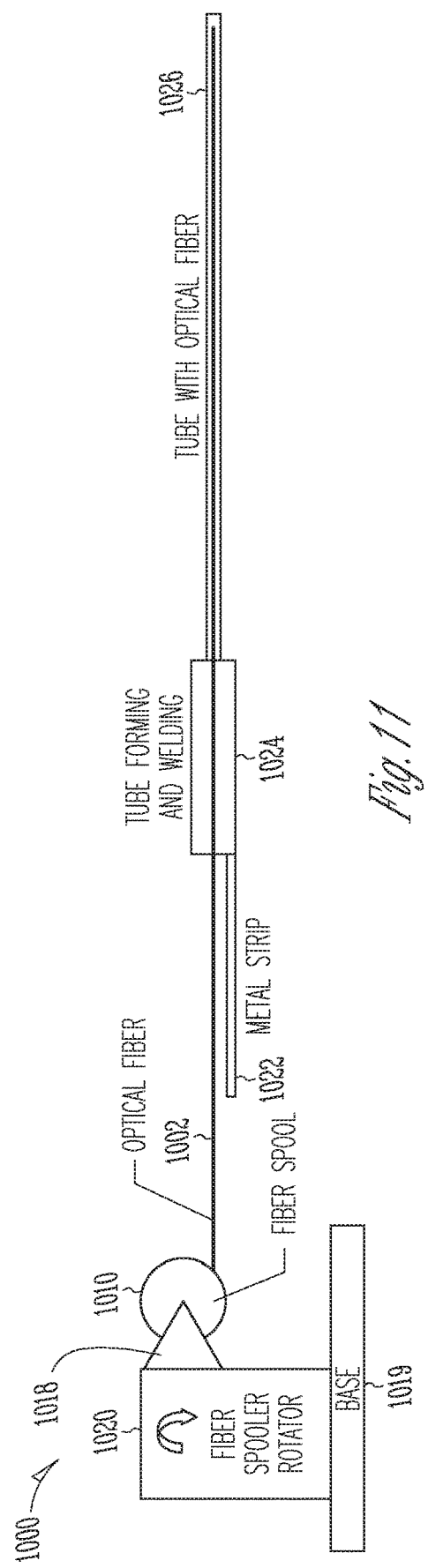

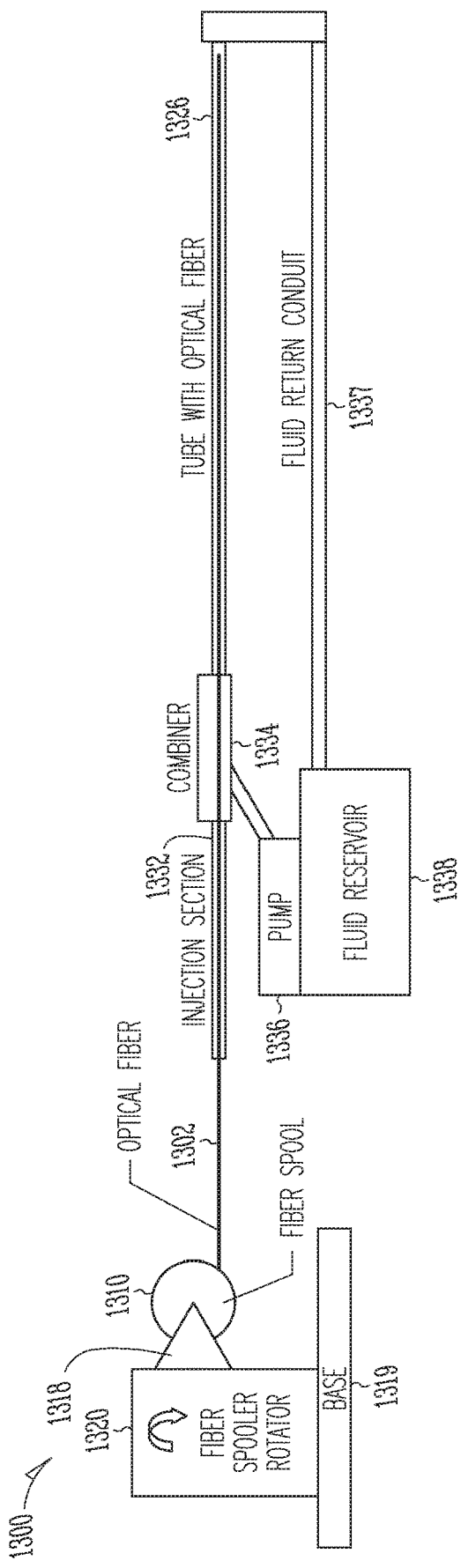
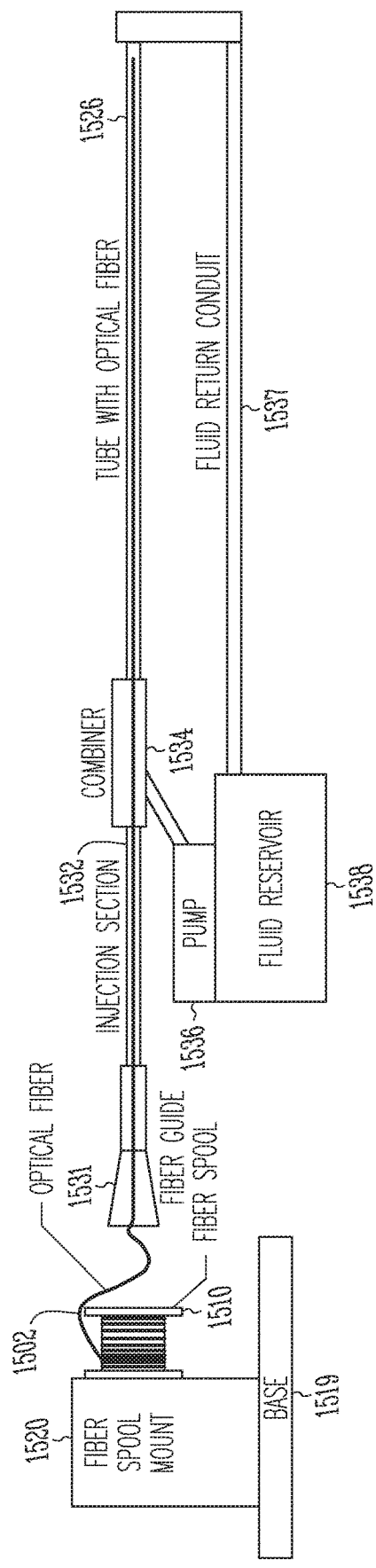

EXCESS OPTICAL FIBER DEPLOYMENT CONTROL

TECHNICAL FIELD

The present invention relates generally to apparatus and methods related to drilling for oil and gas exploration.

BACKGROUND

In the oil and gas industry, the generation and management of wells includes measuring the properties and events associated with the wells and the formations in which the wells are located. A number of techniques can be used to monitor and measure the properties and events associated with the wells. The techniques include the use of distributed temperature sensing (DTS) and distributed acoustic sensing (DAS) systems. DTS and DAS systems are commonly used to identify fluid placement real time, fluid placement by measuring formation temperature warm back, leak detection, cross flow, sand and proppant movement and placement, sand-out, seismic events, and micro-seismic events etc. Permanently installed fiber optic cables are a typical approach used to provide these monitoring and measuring services. As these fiber optic cables cannot be replaced once installed in a well, the quality and reliability of these cables is critical.

Increasingly, optical fibers in metal tubes are also deployed in retrievable cables, where the deployment of the optical fibers in the tube can be critical due to the mechanical manipulation of the cable over its life. In a number of conventional applications of deploying an optical fiber in a tube, optical fibers are also pumped into tubing and used for sensing during various oil field operations. For example, a DTS service has been used widely for wells associated with steam assisted gravity drainage (SAGD), where optical fibers are pumped into tubing and used for down-hole sensing.

BRIEF DESCRIPTION OF THE DRAWINGS

FIG. 10 is a schematic representation of a fiber-into-tube setup with a fiber spool on a rotational device, in accordance with various embodiments.

FIG. 11 is a schematic representation of the fiber-into-tube setup of FIG. 10 with the fiber spool on the fiber spooler rotator at 180 degrees rotation, in accordance with various embodiments.

FIG. 14 is a schematic representation of a fiber-pumped-into-tube setup with a fiber spool on a rotational device at 180 degrees rotation, in accordance with various embodiments.

FIG. 15 is a schematic representation of a fiber-pumped-into-tube setup with a fiber spool sideways, in accordance with various embodiments.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, electrical, and mechanical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, deployment of an optical fiber in a cable can be controlled, for example, to control an amount of excess fiber and the lay of that fiber in a protective tube. The tube may be a cable in which an optical fiber is placed in forming an optical fiber cable. This control can be applied to downhole optical cables, where, in an embodiment, a metal strip is formed around an optical fiber and seam welded to create a tube. Portions of such control techniques can also be applied to optical fibers that are pumped into tubes. For example, the control techniques can be applied to implement optical fiber based distributed measurements in SAGD wells.

The particular deployment of optical fibers in the cables can be critical. Downhole cables are exposed to wide temperature ranges, for example 0° C. to 150° C., or −20° C. to 300° C., or even larger. Due to the larger thermal expansion of a tube versus an optical fiber, the tube should contain excess fiber length (EFL), typically at least 0.1%, or 0.3% and even higher for cables that operate over a wide temperature range. U.S. Patent Publication 20130098528A1 contains a description of the current processes used in the industry to attempt to control EFL. EFL variation can be +/−0.05% or +/−0.1% or +/−0.2% or even higher over the length of a few km, which is a typical cable length.

If EFL is high, then the optical performance of the optical fiber can be degraded. The optical fiber will necessarily have bends in its deployment in the tube. Higher EFL creates smaller bend radius, causing higher optical loss in the optical fiber due to macrobend loss, which degrades the quality of DAS and DTS measurements. An example of bend induced optical loss in an optical fiber in a tube is shown in FIG. 1.

Figure 1:
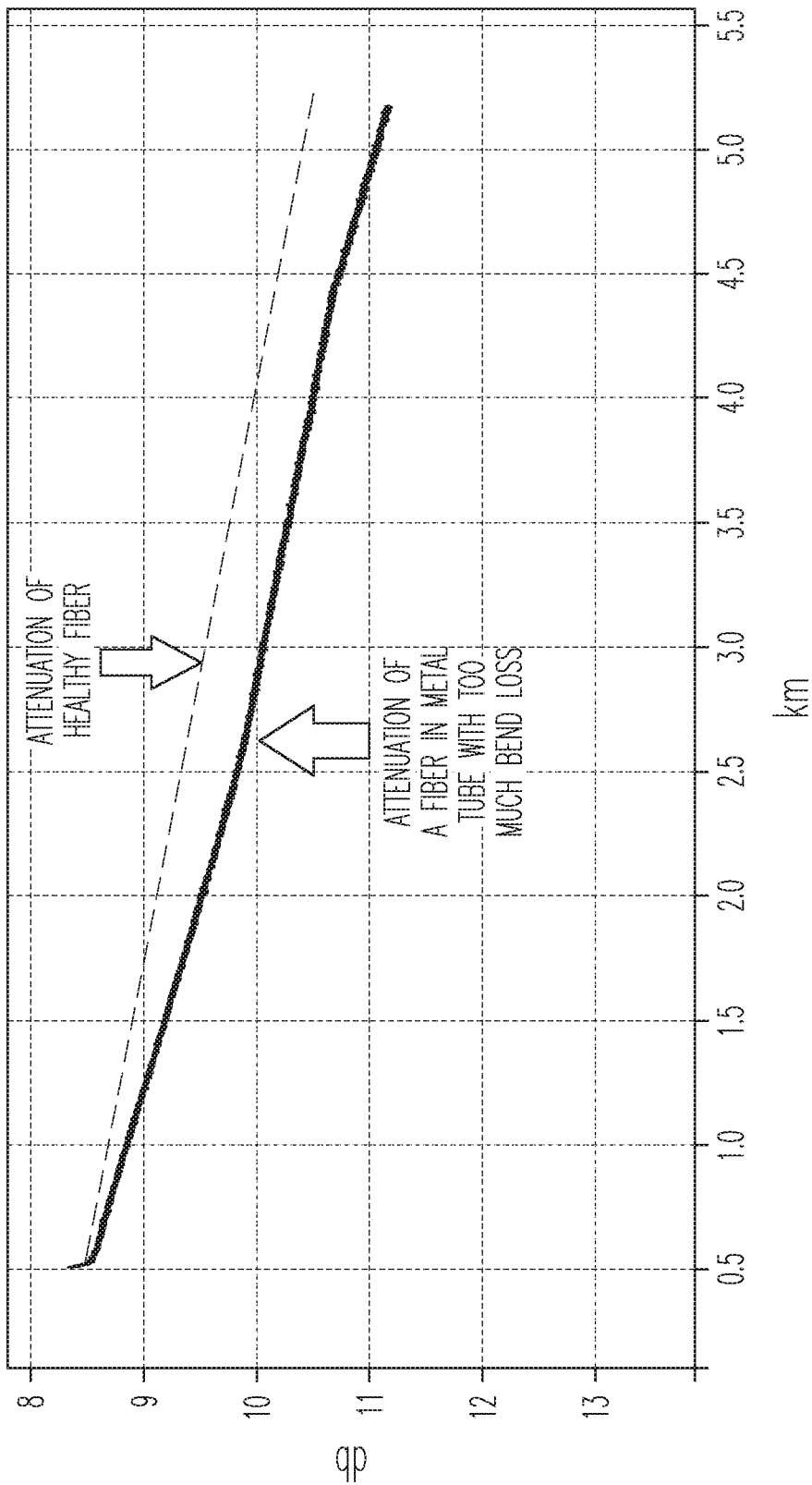
FIG. 1 is a plot of signal versus distance as measured by an optical time-domain reflectometer for an optical fiber in a metal tube in a downhole cable, in accordance with various embodiments.

FIG. 1 is a plot of signal versus distance as measured by an optical time-domain reflectometer (OTDR) for a fiber in metal tube in a downhole cable. The dotted line shows attenuation of a healthy fiber. It indicates what one would typically observe for an optical fiber not experiencing macro bend loss. The solid line shows attenuation of a fiber in metal tube with too much bend loss. High EFL in this cable is the cause of macro bend loss. The bend induced loss is higher in some parts of cable, where the slope is steepest, also indicating that EFL is also not uniform in this cable.

Conversely if EFL is too low, when the tube is placed under tension and/or the tube temperature is raised, the EFL will be eliminated and the optical fiber will be in tension and the optical fiber will be pulled into contact with the tube wall. The optical fiber being forced into contact with a surface can induce micro-bending loss, which degrades the quality of DAS and DTS measurements. Also, if the cable is lengthened beyond the fiber EFL, the optical fiber will be in tension and the optical fiber will eventually break, thus greatly reducing the life and reliability of the cable.

Figure 2:
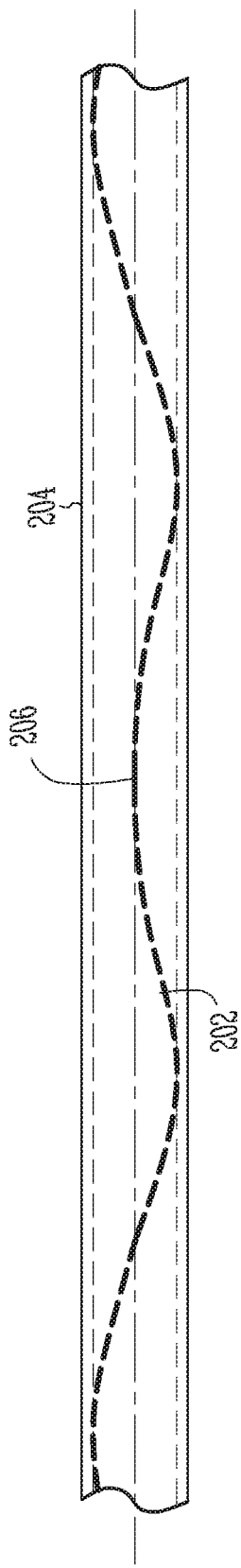
FIG. 2 is an image of optical fiber deployed in a clear tube with tendril perversion reversal near the midpoint, in accordance with various embodiments.

In addition to too high or low EFL, another issue with the conventional optical fiber tubing methods is a change in lay of the optical, described here as tendril perversion reversal also known as spontaneous helix hand reversal, which further increases macro and micro bend loss. FIG. 2 is an image of optical fiber deployed in clear tube with tendril perversion reversal near the midpoint. The tube has the same inside diameter of typical tubes (2.8 mm used in downhole cables. This fiber was deployed in the tube without any rotation of the fiber about its axis, referred to herein as twist. These reversals must necessarily form in the tube if the optical fiber is not rotated during tubing. The effect described in FIG. 2 is well known and is described, for example, in "Spontaneous Helix Hand Reversal and Tendril Perversion in Climbing Plants," Physical Review Letters, volume 80, number 7, pages 1564-1567.

An issue associated with tendril perversion reversal is that at the point where the tendril perversion reversal happens, the radius of curvature at the reversal is higher than in the helix on either side, thus increasing bend loss over that of a single handed helix. In addition, the normal forces in the region of the reversal can apply sufficient force to induce microbending loss.

Lack of an effective EFL control method and the presence of reversals leads to increased macrobend loss and/or microbend loss, each of which degrades the quality of DAS and DTS measurements. In various embodiments, techniques are implemented to prepare a single handed helix fiber with a controlled deployment in a tube that improves control over EFL and obtains higher EFL, both enabling lower microbending loss and lower macrobending loss.

In a conventional process, an optical fiber is fed from a spool into an area where a metal strip is formed into a tube, which is then seam welded, containing the optical fiber inside. One approach to controlling EFL has included controlling the speed of the fiber with respect to the tube via a mechanical injection device.

In other alternative conventional processes, an optical fiber can be pumped into an existing tube using fluid drag. In some of these processes, the fiber spool is normally held in place using a fiber spooler, and the optical fiber is fed into the tube as the optical fiber is being pulled into the tube.

In another conventional approach, a system includes an injection section, having a mechanical mechanism to push the optical fiber into the tube forming, and a welding section. The tube may have a stopper/flow restriction at the distal end of the sensing fiber to allow the fluid to drag the fiber towards the distal end of the tube.

An optical fiber in tube deployment system may utilize one or several of the three methods described above, that is, weld the fiber into the tube, propel the fiber inside the tube using fluid drag, and/or pull the fiber forward using a stopper/flow restriction. The tube may be extended out on the ground during the pump-in of the sensing optical fiber, or the tube may sit on a spool during the fiber deployment. The tube may be several thousands of feet in length, and tubes in excess of 20,000 ft may be used.

The distal end of the sensing optical fiber will at some time hit the distal end of the tube, and the sensing optical fiber will then start to coil or spiral up against the inside diameter of the tube. The sensing optical fiber will spiral up against the inner diameter (ID) of the tube in a helix until other forces cause a reversal of the helix spiral direction. There will be a torsional element/force in the sensing optical fiber that will build up over distance, and the sensing optical fiber will then occasionally have a tendril perversion reversal. The sensing optical fiber may move inside the tube as the tube is deployed, largely vertical, in hydrocarbon producing wells. This fiber movement may then cause the sensing optical fiber to bunch up and kink, and possibly break, or to display high macro and micro bend loss.

A sensing optical fiber deployed inside a tube will initially coil up symmetrically inside the tube like a helical spring, but it is anticipated that there will be changes in the coiling direction, which change is referred to as spontaneous helix hand reversal or tendril perversion reversal discussed above. The cause for tendril perversion reversal is that the sensing optical fiber has torsional stiffness and this torsional stiffness will at various points overcome the force that coils the optical fiber like a helical spring in one direction. The tendril perversion reversal happens when the torsional stiffness is larger than the coiling force, and the rotation of the helix will then alternate between left and right hand rotation/helix. Whether or not a helix is left or right handed is randomly chosen in nature.

Figure 3:
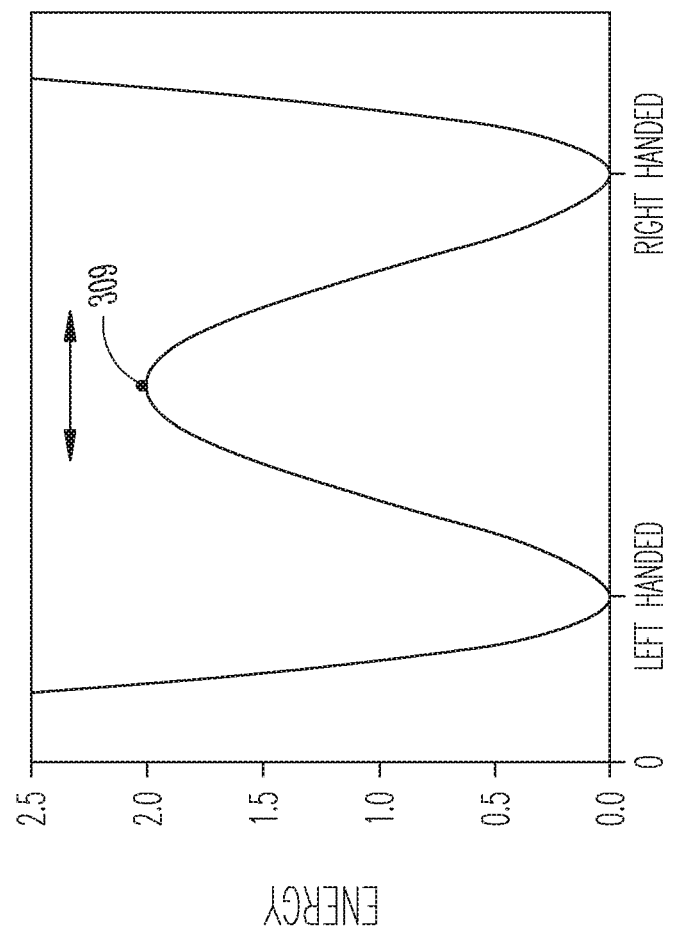
FIG. 3 is a schematic representation of the initial state of an optical fiber cable before it goes into a helix, in accordance with various embodiments.
Figure 4:
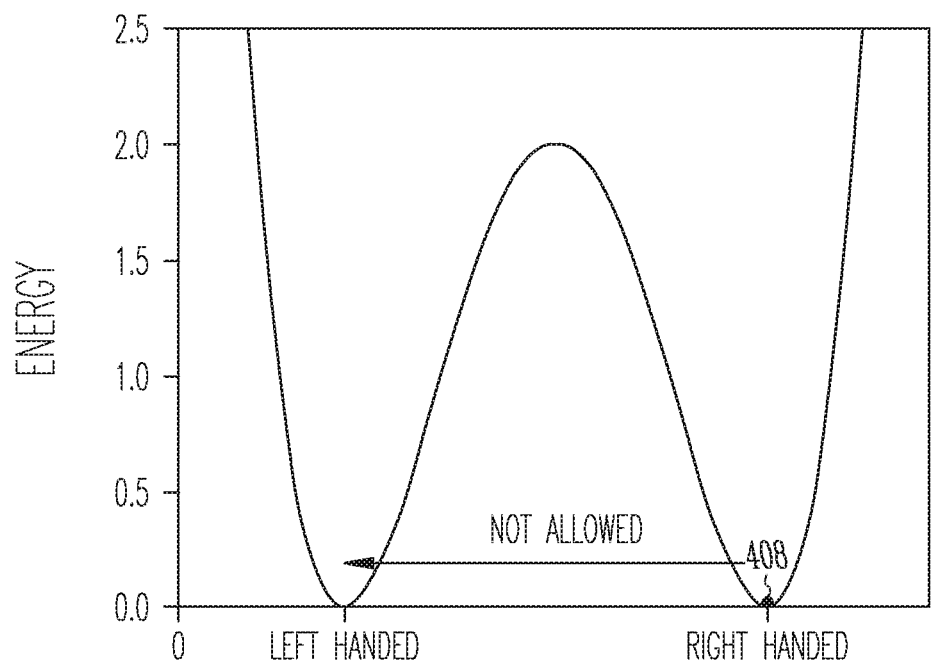
FIG. 4 is a schematic representation of a system regarding a state of an optical fiber after the optical fiber has been placed in a right handed state, in accordance with various embodiments.

FIG. 3 is a schematic representation of the initial state of an optical fiber cable before it goes into a helix. The circle 309 corresponds to the initial state of the optical fiber, which is straight in the FIG. 3. The optical fiber being straight in the tube is an unstable state, and once perturbed, for example put under compression, it will spontaneously choose either being left or right handed. Once a helix is in either a left or a right state, it requires some amount of energy to make the switch from a left to a right state, or vice versa. The energy is identical to the energy required to straighten out the optical fiber, that is, there is no situation where 'tunneling' from the right handed state to the left handed state is possible or vice versa. FIG. 4 is a schematic representation of an optical fiber regarding a state 408 of the optical fiber after the optical fiber has been placed in a right handed state in a system. Once the optical fiber is put into a state, it cannot flip handedness state until the optical fiber is straightened out. Additionally, while placing the sensing optical fiber into the tube, it is possible for the helix to change handedness. In the conventional processes, there is no way to guarantee that the sensing optical fiber will go into the tube in one state.

Figure 5:
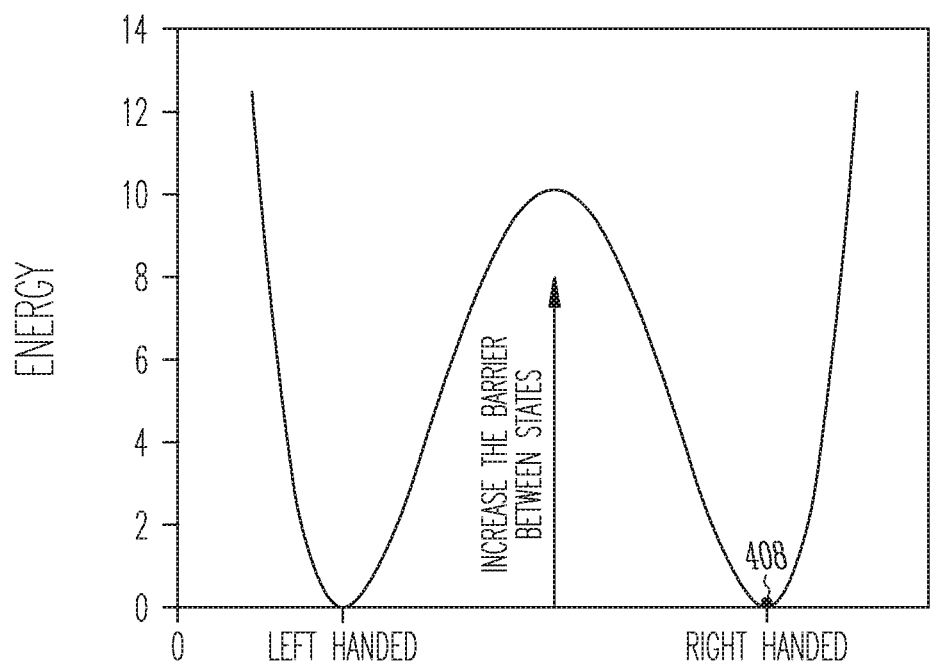
FIG. 5 is a schematic representation of increased energy to transition between states of an optical fiber, in accordance with various embodiments.

In various embodiments as taught herein, the randomness of the state of the optical fiber in the tube can be removed by choosing the state that the helical sensing optical fiber is in from the beginning of the process of placing the sensing optical fiber in the tube. Once in the tube, the only time the sensing optical fiber can switch handedness is when the sensing optical fiber is straightened out. However, by making the energy required to straighten out the fiber sufficiently large, the optical fiber it will not be straightened out. FIG. 5 is a schematic representation of increased energy to transition between states, such as the right handed state 408 and the left handed state.

In accordance with teachings herein, procedures of arranging a system, whereby tendril perversion reversal is eliminated and the optical fiber incorporated in a tube is in a single handed helix, enable improved control of EFL and improved optical performance. It has been found by the inventors that applying a twist to an optical fiber during tubing is a robust method to control the deployment of the fiber in the tube. Specifically, it has been determined that the optical fiber will form a single handed helix if twisted during tubing. Further, it was found that there is a relationship between the degrees of twist applied per tube section and the pitch of the naturally formed helix. For example, for a typical tube for use in the oil and gas industry having an ID of 2.8 mm, an optical fiber twisted by 180 degrees naturally forms a helix of approximately 10 cm in lay length.

Figure 6:
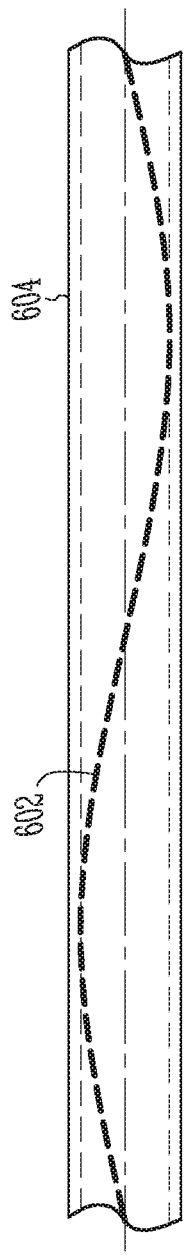
FIG. 6 is a schematic representation of an optical fiber with 180 degrees twist per 10 cm in lay length that naturally forms a single handed helix in a tube with about 10 cm pitch, in accordance with various embodiments.
Figure 7:
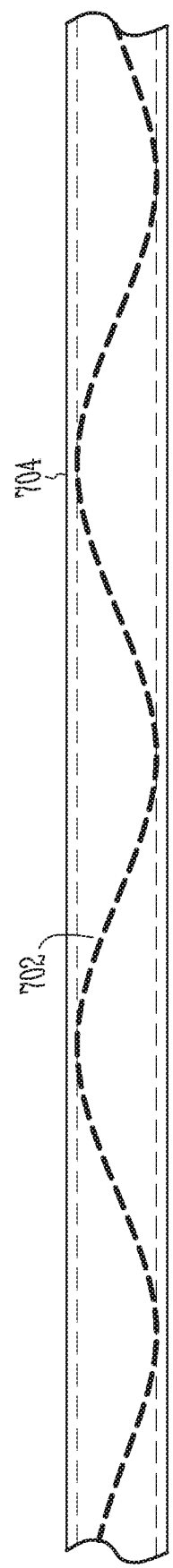
FIG. 7 is a schematic representation of an optical fiber with 360 degrees twist per 10 cm in lay length that naturally forms a single handed helix in a tube with about 5 cm pitch, in accordance with various embodiments.
Figure 8:
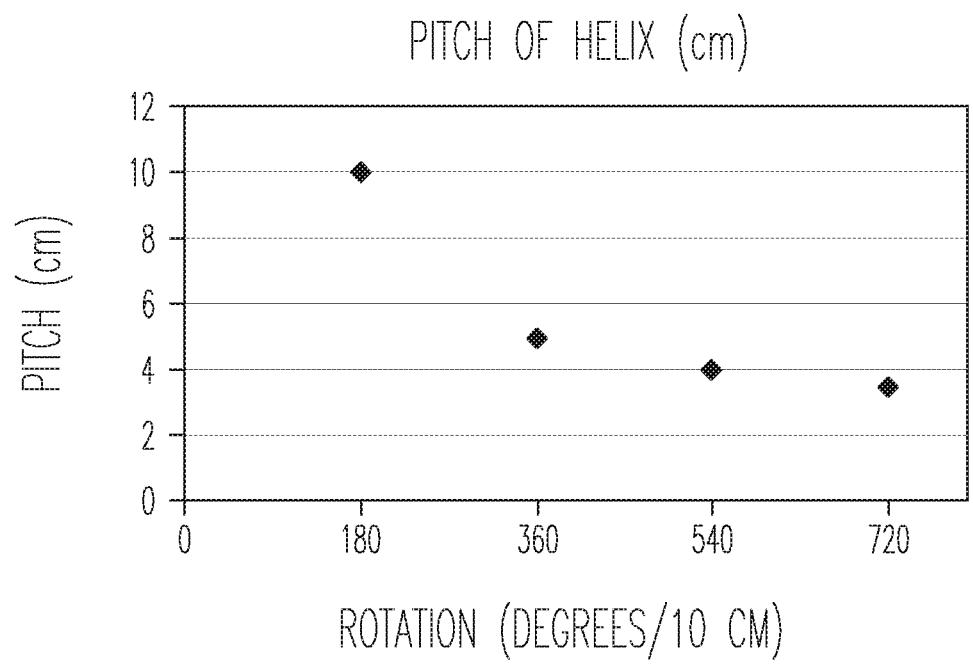
FIG. 8 is a plot of experimental data points relating twist to helix pitch, in accordance with various embodiments.

FIG. 6 is a schematic representation of an optical fiber 602 with 180 degrees twist per 10 cm in lay length that naturally forms a single handed helix in a tube 604 with about 10 cm pitch. FIG. 7 is a schematic representation of an optical fiber 702 with 360 degrees twist per 10 cm in lay length that naturally forms a single handed helix in a tube 704 with about 5 cm pitch. FIG. 8 is a plot of experimental data points relating twist to helix pitch. Knowing the helix pitch allows calculation of excess optical fiber length in a tube and then determination of the overall relationship between twist or rotation per unit length and EFL.

Figure 9:
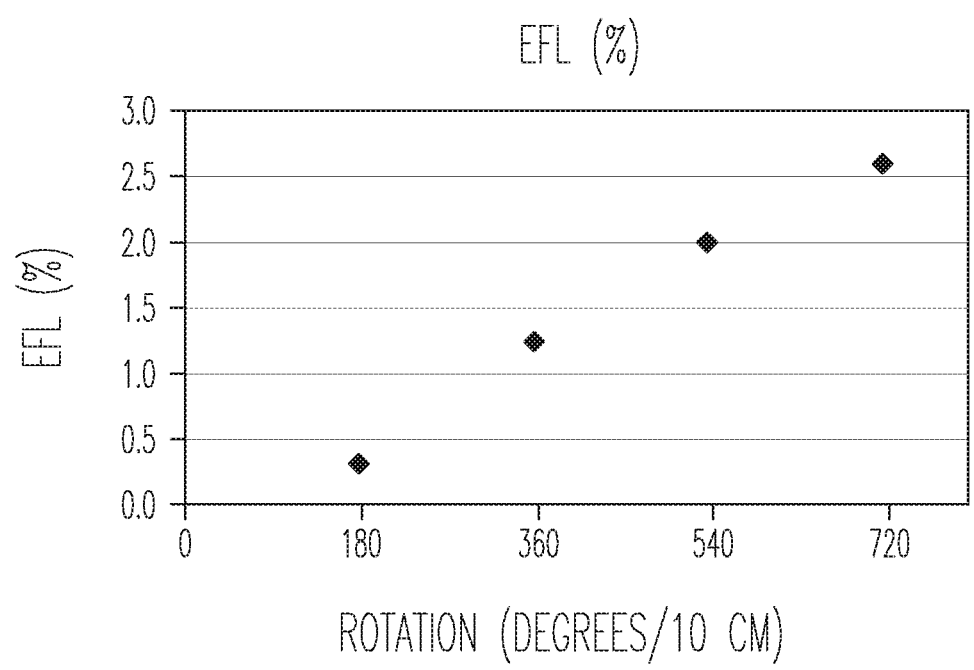
FIG. 9 is a plot of direct relationship between twist or rotation of optical fiber per unit length and resulting excess fiber length in a tube, in accordance with various embodiments.

FIG. 9 is a plot of direct relationship between twist or rotation of optical fiber per unit length and resulting EFL in a tube. Imparting a known twist or a known rotation per unit length to the optical fiber during the tubing process results in natural formation of a single handed helix, the lay length of the helix being related directly to the amount of twist applied per unit length, and the lay length being directly related to the EFL in the tube. Thus, imparting a known twist or a known rotation per unit length to the optical fiber during the tubing process provides a method to control EFL in a tube. The twist and resulting naturally formed single handed helix also reduces normal force between the optical fiber and the surface of the tube that it contacts, which also reduces microbending loss that can be induced in optical fibers due to contact with a surface. This is particularly advantageous for optical fibers coated with the thin polyimide coatings used in high temperature applications, as this polyimide coated optical fiber is significantly sensitive to microbending. Examples of high temperatures applications include, but are not limited to, temperature applications up to 300° C. Pumped-in optical fiber applications for SAM wells can include such polyimide coated optical fibers.

In an embodiment, a method of placing an optical fiber in a tube can include mounting a fiber spool on a spooler that allows rotation of the fiber spool during the tubing. This arrangement allows for control of the torsion in the optical fiber and for achieving a predetermined one-directional rotation/coiling of the optical fiber in the tube.

FIG. 10 is a schematic representation of a fiber-into-tube setup 1000 with a fiber spool 1010 on a fiber spooler rotator 1020 for a tubing process. A fiber spooler rotator is a rotational device that can be implemented with a motor-like device and coupling components to couple to a fiber spool to move the fiber spool in a rotating motion. The fiber spooler rotator 1020 may be attached to a base 1019 with coupling components 1018 holding the fiber spool 1010. An optical fiber 1002, on which the tubing process is being conducted, can be directed from the fiber spool 1010 over a metal strip 1022. The optical fiber 1002 can be pulled from the fiber spool 1010 in a direction that is substantially along the direction of the metal strip 1022. An axis of the fiber spool 1010, about which the optical fiber 1002 is wrapped, can be substantially perpendicular to the direction of the metal strip 1002 that can be in line with a tube forming and welding apparatus 1024. The tube forming and welding apparatus 1024 can operate to form the metal strip 1022 around the optical fiber 1002 and seam weld the metal strip 1022 to create a tube with an optical fiber 1026, which can be formed as an optical fiber cable for use in a wellbore.

FIG. 11 is a schematic representation of the fiber-into-tube setup 1000 of FIG. 10 with the fiber spool 1010 on the fiber spooler rotator 1020 at 180 degrees rotation. The fiber spooler rotator can rotate the fiber spool 1010 continuously with a programmable rate to achieve a desired twist on the optical fiber 1002 as it is being inserted. The fiber spooler rotator 1020 can include a sliding mechanism to allow the coupling components 1018 to move vertically from the base 1019 to the top of the fiber spooler rotator 1020. This can allow the optical fiber 1002 to be pulled straight to the metal strip 1022 as the diameter of the fiber spool 1010 can change as optical fiber 1002 is used in the manufacturing of the tube with optical fiber 1026. This arrangement allows deployment of a sensing optical fiber into a tube while applying a controlled amount of twist on the sensing optical fiber, which provides control of the direction of the helical rotation inside the tube.

Figure 12:
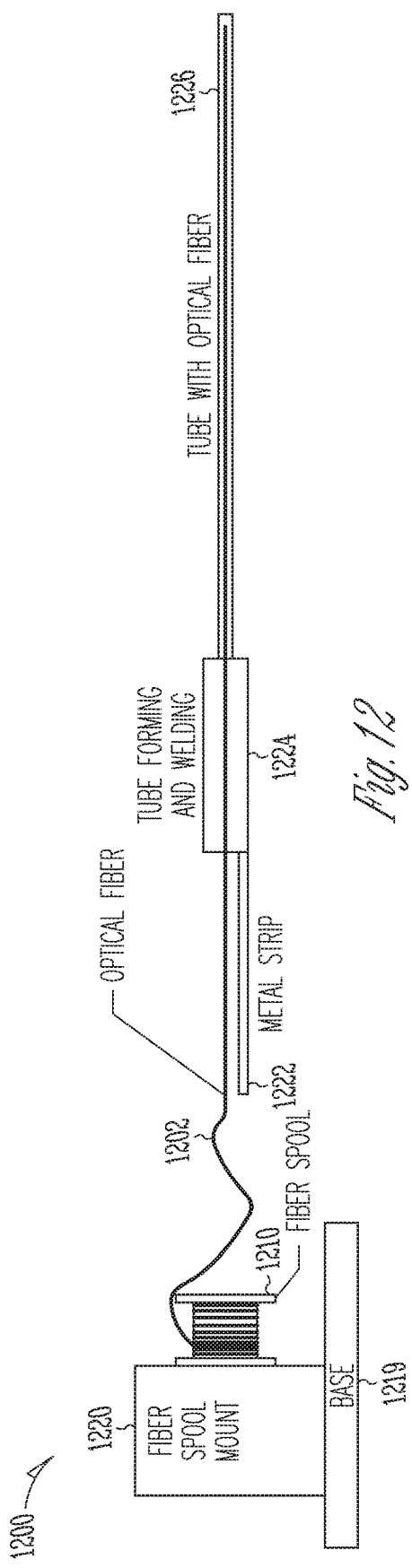
FIG. 12 is a schematic representation of a fiber-into-tube setup with a cable spool sideways, in accordance with various embodiments.

In an embodiment, a method of placing an optical fiber in a tube can include mounting a cable spool sideways and pulling the optical fiber off the spool to generate a set amount of optical fiber twist. FIG. 12 is a schematic representation of a fiber-into-tube setup 1200 with a cable spool 1210 mounted sideways to a fiber spool mount 1220. The sideways arrangement may be considered as being sideways, for instance, relative to the arrangement of FIG. 10. The fiber spool mount 1220 may be attached to a base 1219 with the fiber spool 1210 attached to the fiber spool mount 1220. An optical fiber 1202, on which the tubing process is being conducted, can be directed from the fiber spool 1210 over a metal strip 1222. The optical fiber 1202 can be pulled from the fiber spool 1210 in a direction that is substantially along the direction of the metal strip 1222. An axis of the fiber spool 1210, about which the optical fiber 1202 is wrapped, can be substantially parallel to the direction of the metal strip 1222 that can be in line with a tube forming and welding apparatus 1224. The tube forming and welding apparatus 1224 can operate to form the metal strip 1222 around the optical fiber 1202 and seam weld the metal strip 1222 to create a tube with an optical fiber 1226, which can be formed as an optical fiber cable for use in a wellbore.

Figure 13:
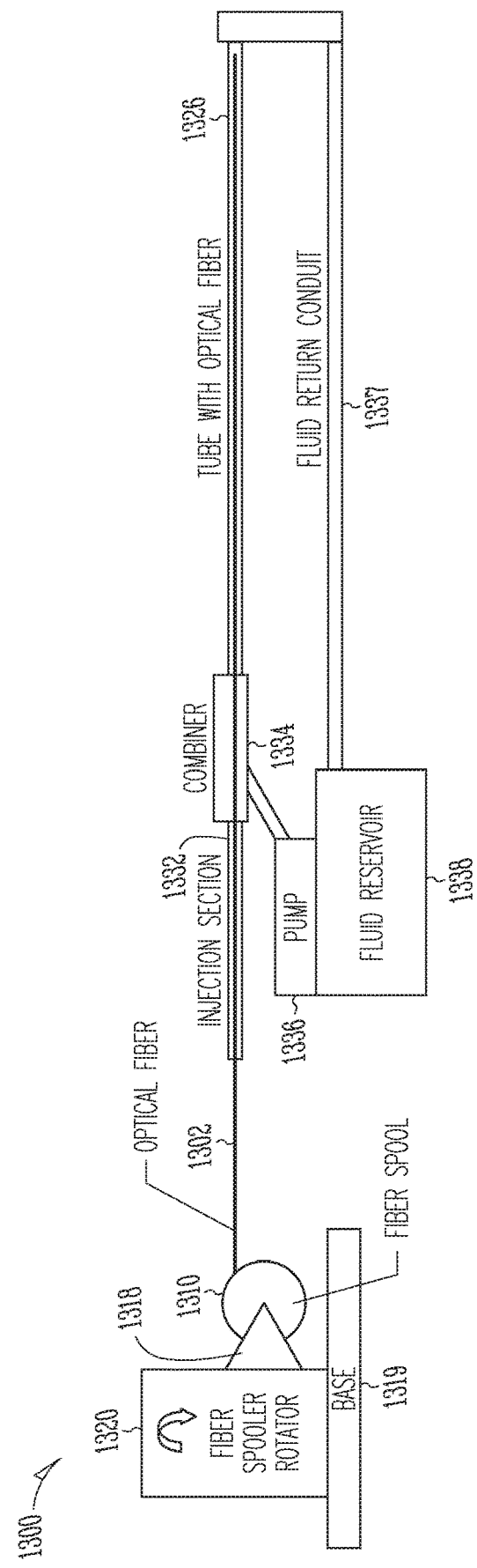
FIG. 13 is a schematic representation of a fiber-pumped-into-tube setup with a fiber spool on rotational device, in accordance with various embodiments.

Alternatively, an optical fiber may be pumped into an existing tube in embodiments, as depicted in FIGS. 13-15. FIG. 13 is a schematic representation of a fiber-pumped-into-tube setup 1300 with a fiber spool 1310 on a fiber spooler rotator 1320. The fiber spooler rotator 1320 may be attached to a base 1319 with coupling components 1318 holding the fiber spool 1310. An optical fiber 1302, on which the tubing process is being conducted, can be directed from the fiber spool 1310 to an injection section 1332. The optical fiber 1302 can be pulled from the fiber spool 1310 in a direction that is substantially along the direction of the injection section 1332. An axis of the fiber spool 1310, about which the optical fiber 1302 is wrapped, can be substantially perpendicular to the direction of the injection section 1332 that can be in line with a combiner 1334. A pump 1336 pumps fluid from a fluid reservoir 1338 to the combiner 1334 to combine with the optical fiber to push the optical fiber 1302 into the tube forming a tube with an optical fiber 1326, which can be formed as an optical fiber cable for use in a wellbore. The fluid used in the combining can be returned to the fluid reservoir 1338 via a fluid return conduit 1337.

FIG. 14 is a schematic representation of the fiber-pumped-into-tube setup 1300 of FIG. 13 with the fiber spool 1310 on the fiber spooler rotator 1320 at 180 degrees rotation. The fiber spooler rotator 1320 can include a sliding mechanism to allow the coupling components 1318 to move vertically from the base 1319 to the top of the fiber spooler rotator 1320. This can allow the optical fiber 1302 to be conveyed straight to the injection section 1332.

FIG. 15 is a schematic representation of a fiber-pumped-into-tube setup 1500 with a fiber spool 1510 mounted sideways to a fiber spool mount 1520. The sideways arrangement may be considered as being sideways, for instance, relative to the arrangement of FIG. 13. The fiber spool mount 1520 may be attached to a base 1519 with the fiber spool 1510 attached to the fiber spool mount 1520. An optical fiber 1502, on which the tubing process is being conducted, can be directed from the fiber spool 1510 to an injection section 1532. A fiber guide 1531 may be used to direct the optical fiber 1502 to the injection system 1532. The optical fiber 1502 can be pulled from the fiber spool 1510 in a direction that is substantially along the direction of the injection section 1532. An axis of the fiber spool 1510, about which the optical fiber 1502 is wrapped, can be substantially aligned with the direction of the injection section 1532 that can be in line with a combiner 1534. A pump 1536 pumps fluid from a fluid reservoir 1538 to the combiner 1534 to combine with the optical fiber 1502 to push and/or drag the optical fiber 1502 into the tube forming a tube with an optical fiber 1526, which can be formed as an optical fiber cable for use in a wellbore. The fluid used in the combining can be returned to the fluid reservoir 1538 via a fluid return conduit 1537.

Figure 16:
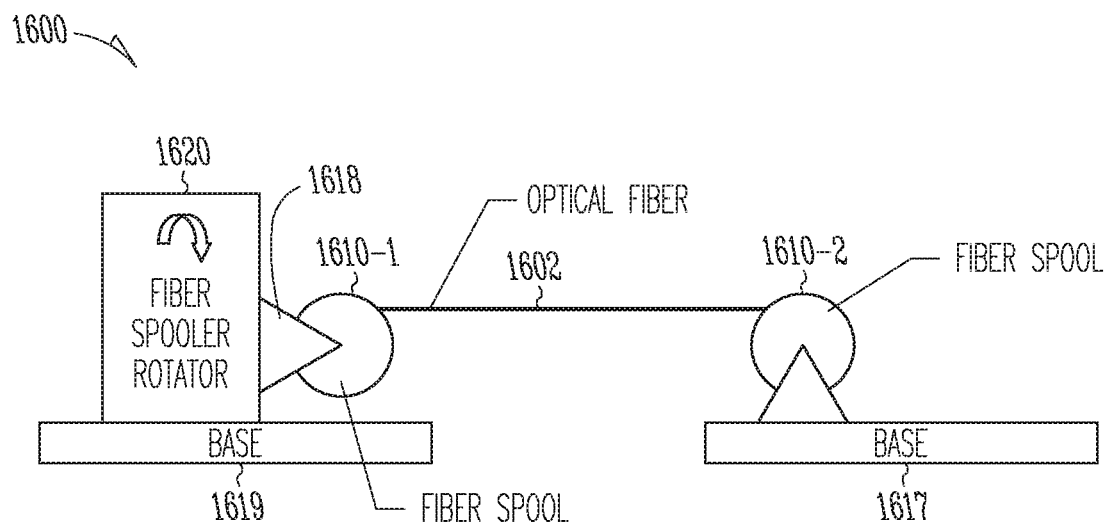
FIG. 16 is a schematic representation of a fiber-into-tube setup, where an optical fiber is rotated and re-spooled, in accordance with various embodiments.

FIG. 16 is a schematic representation of a fiber-into-tube setup 1600, where an optical fiber 1602 is rotated and re-spooled from a first fiber spool 1610-1 to a second fiber spool 1610-2 such that it is pre-twisted on the second fiber spool 1610-2 and then can be fed into a conventional tubing or pumping line. A conventional tubing or pumping line is one in which an optical fiber is placed in a tube without the capabilities discussed herein. The fiber-into-tube setup 1600 can include the fiber spool 1610-1 coupled to the fiber spooler rotator 1620. The fiber spooler rotator 1620 may be attached to a base 1619 with coupling components 1618 holding the fiber spool 1610-1. An optical fiber 1602, on which the tubing process is being conducted, can be directed from the fiber spool 1610-1 to the fiber spool 1610-2. The fiber spool 1610-2 may be coupled to a base 1617.

The architectures of tubing systems to construct an optical fiber in a tube as shown in FIGS. 10-16 can be realized with the fiber spooler rotators and/or fiber spool mounts coupled to fiber spools in conjunction with conventional tubing process structures. Such architectures, as discussed herein, may be viewed as novel modifications to existing conventional tubing process structures.

These methods can be extended to create tubes with multiple optical fibers with interlaced single handed helix, where the optical fibers do not cross over, thus eliminating bend loss associated with optical fiber crossovers. For example, two optical fibers can form a double helix if optical fiber spools are rotated and the assembly holding fiber spools also rotates. This configuration has an additional advantage in the case where the EFL is pulled out from the cable, resulting in the optical fibers forming a tightly nested double helix in which the period of the helix can be determined by the rotation of the assembly holding the fiber spools. Compared to a single, straightened out optical fiber, this twisted pair strongly breaks the symmetry that causes tendril perversion and strongly biases the optical fibers to reform a helix with the original pitch if the cable becomes shortened, as when tension is released on the cable.

Given that placing an optical fiber in a tube, as taught herein, is in a controlled deployment and reversals have been removed, the optical fiber in the tube can pass through subsequent manufacturing processes such as stranding, armoring, and encapsulation with a lower likelihood of issues caused by optical fiber deployment. In addition, these techniques can be used for a variety of downhole cables.

Figure 17:
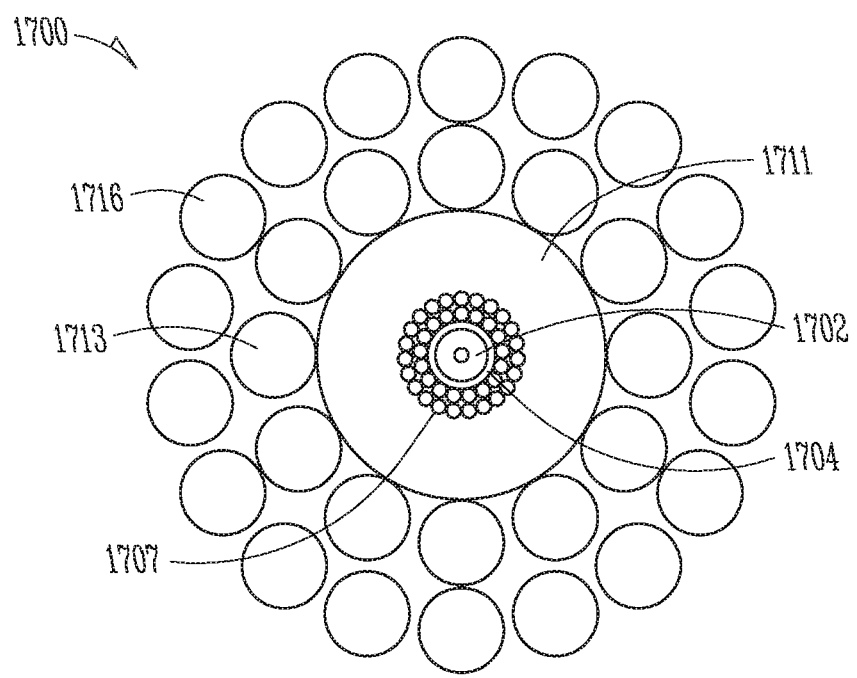
FIG. 17 is a schematic representation of a retrievable wireline cable 1700 having an optical fiber arranged with single handed helix deployment and coaxial in the retrievable wireline cable, in accordance with various embodiments.

FIG. 17 is a schematic representation of a retrievable wireline cable 1700 having optical fiber(s) arranged with single handed helix deployment and coaxial in the retrievable wireline cable 1700. The retrievable wireline cable 1700 can include an optical fiber 1702 in a metal tribe 1704. In various embodiments, the optical fibers 1702 may be in a gel within the metal tube 1704. The metal tube 1704 can surround by a braided metal structure 1707 such as braided copper, where the braided metal structure 1707 can be surrounded by an insulator 1711. The braided metal structure 1707 may be used to provide power, for example, power to downhole electronics and/or to apply power to a tractor to pull the retrievable wireline cable 1800 into a well. Around the insulation 1711 can be outer two rings 1713 and 1716 of steel and armor for example. The retrievable wireline cable 1700 can be placed in a well and retrieved, which can be actions be performed with the retrievable wireline cable 1700 having a relatively flexible structure. The application of the retrievable wireline cable 1700 can be subject to tension and stretching mechanically, where the deployment of the optical fiber 1702 in the metal tube 1704 using techniques as taught herein can provided sufficient EFL in the metal tube 1704 to reduce the risk of optical loss and/or possible damage or breakage of the optical fiber 1702 due to stretching.

Figure 18:
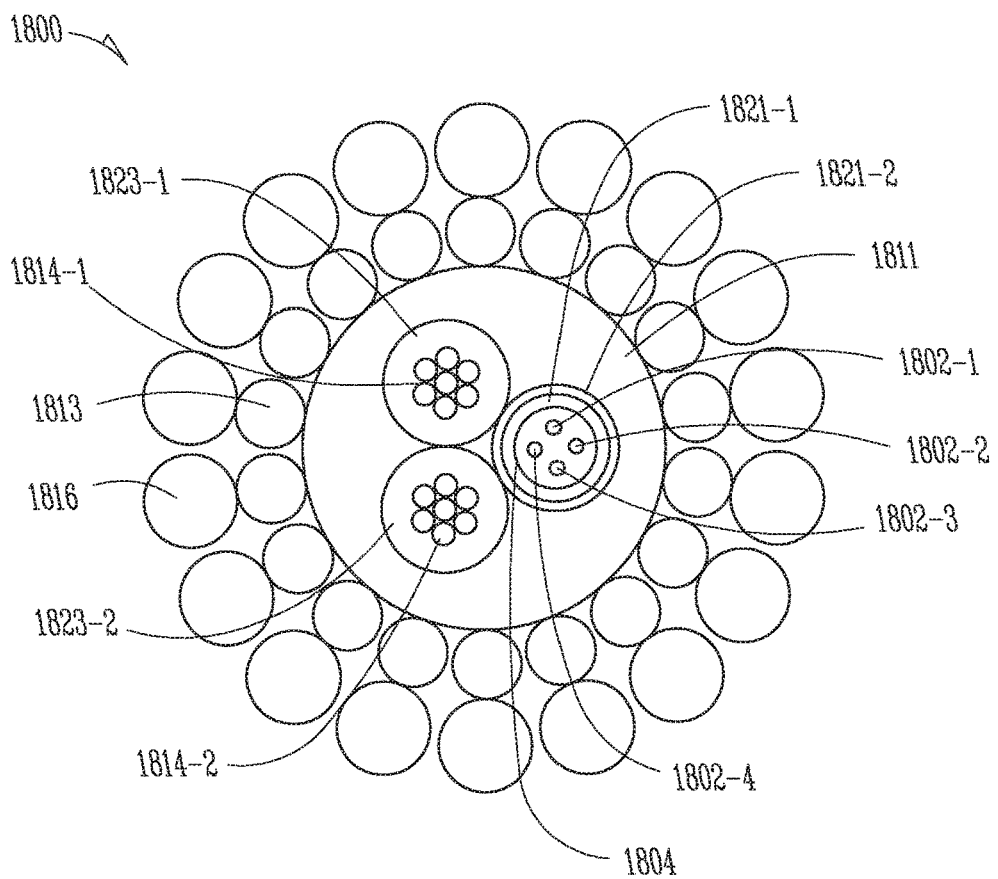
FIG. 18 is a schematic representation of a retrievable wireline cable including a tube having optical fibers arranged with single handed helix deployment and helically wound with other core elements in the retrievable wireline cable, in accordance with various embodiments.

FIG. 18 is a schematic representation of a retrievable wireline cable 1800 including a tube having optical fibers arranged with single handed helix deployment and helically wound with other core elements in the retrievable wireline cable. The retrievable wireline cable 1800 can include optical fibers 1802-1, 1802-2, 1802-3, and 1802-4 in a metal tube 1804. Though FIG. 18 shows four optical fibers, more or less than four optical fibers may be implemented in the arrangement shown. In various embodiments, the optical fibers 1802-1, 1802-2, 1802-3, and 1802-4 may be in a gel within the metal tube 1804. The metal tube 1804 can surround by a number of insulating layers such as layers 1821-1 and 1821-2. The retrievable wireline cable 1800 can also include groups 1814-1 and 1814-2 of electrically conductive wires surrounded by insulation 1823-1 and 1823-2, respectively. The groups 1814-1 and 1814-2 of electrically conductive wires may be copper wires. The groups 1814-1 and 1814-2 of electrically conductive wires may be provided to provide power to downhole electronics and/or to apply power to a tractor to pull the retrievable wireline cable 1800 into a well. The metal tube 1804 and its insulation and the groups 1814-1 and 1814-2 of electrically conductive wires and their respective insulation can be surrounded by additional insulation 1811. Around the insulation 1811 can be outer two rings 1813 and 1816 of steel and armor for example.

For retrievable cables, the cable may lengthen due to mechanical and/or temperature effects during use by 0.5% or 1.0% or as much as 2% or higher. Typical EFL in a tube from conventional processing is only about 0.5%, which can result in optical fibers in retrievable cables being placed under tension, which reduces the reliability of the cable due to increased probability of an optical fiber break, and also increases microbend loss as an optical fiber under tension will be pulled to the tube wall with the tube not perfectly straight. Based on the control of EFL, by applying optical fiber twist as taught herein, and given that such techniques can eliminate reversals, higher EFL in a cable can be achieved. For example, 1% or 2% or higher may be achieved, which may keep the optical fiber from being put in tension, improving reliability and preventing microbend loss. At high EFL, the effective bend radius of the optical fiber in a helix can be 80 cm, 60 cm or lower, and, in such cases a bend resistant optical fiber can prevent significant macro bend loss.

Given that the procedures of placing an optical fiber in a tube, as taught herein, provides a controlled deployment in which reversals can be removed, the optical fiber in the tube can be lengthened and shrunk when the optical fiber is in an application, for example, by temperature cycling, cable mechanical stretch, or other mechanisms associated with the application with a lower likelihood of issues caused by optical fiber deployment. In addition, the optical fiber in the tube may be otherwise manipulated, for example by mechanical forming over a sheave, with a lower likelihood of issues caused by optical fiber deployment.

Figure 19:
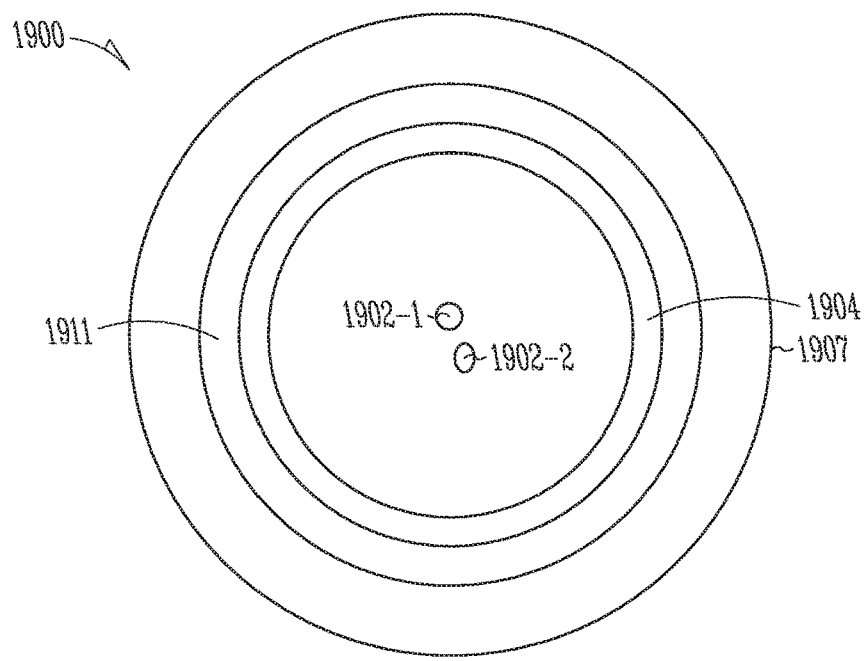
FIG. 19 is a schematic representation of a cable structure having optical fiber(s) arranged with single handed helix deployment and coaxial in the cable structure for permanent installation or for slickline applications, in accordance with various embodiments.

FIG. 19 is a schematic representation of a cable structure 1900 having optical fiber(s) arranged with single handed helix deployment and coaxial in the cable structure 1900 for permanent installation or for slickline applications. The cable structure 1900 can include can include optical fibers 1902-1 and 1902-2. In an inner metal tube 1904. Though FIG. 19 shows two optical fibers, more or less than two optical fibers may be implemented in the arrangement shown. In various embodiments, the optical fibers 1902-1 and 1902-2 may be in a gel within the inner metal tube 1904. The inner metal tube 1904 can be surrounded by an insulating layer 1911. The insulating layer 1911 can be surrounded by an outer metal tube 1907.

Figure 20:
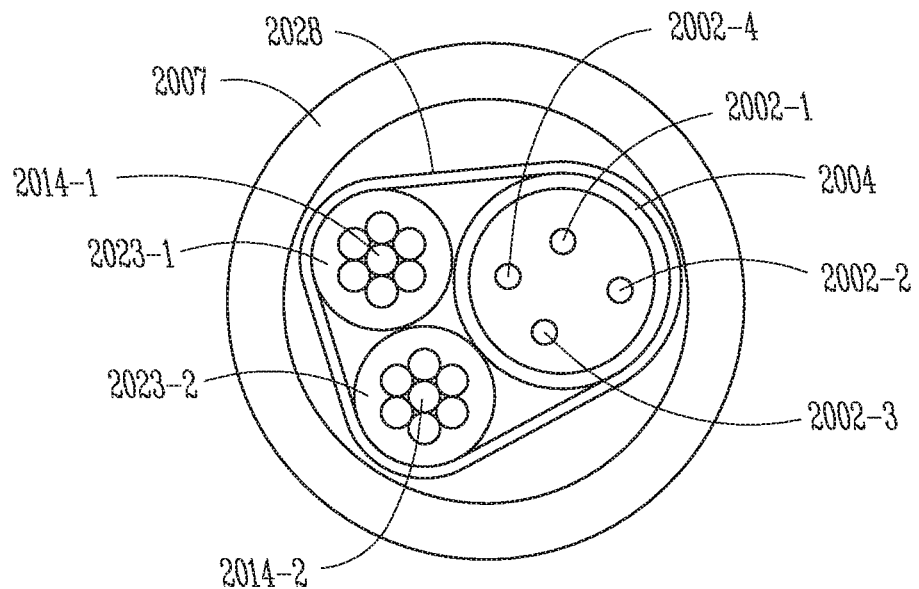
FIG. 20 is a schematic representation of a cable structure having optical fibers arranged with single handed helix deployment and helically wound with other core elements in the cable structure for permanent installation, in accordance with various embodiments.

FIG. 20 is a schematic representation of a cable structure 2000 having optical fibers arranged with single handed helix deployment and helically wound with other core elements in the cable structure 2000 for permanent installation. The cable structure 2000 can include optical fibers 2002-1, 2002-2, 2002-3, and 2002-4 in a metal tube 2004. Though FIG. 20 shows four optical fibers, more or less than four optical fibers may be implemented in the arrangement shown. In various embodiments, the optical fibers 2002-1, 2002-2, 2002-3, and 2002-4 may be in a gel within the metal tube 2004. The cable structure 2000 can also include groups 2014-1 and 2014-2 of electrically conductive wires surrounded by insulation 2023-1 and 2023-2, respectively. The groups 2014-1 and 2014-2 of electrically conductive wires may be copper wires. The groups 2014-1 and 2014-2 of electrically conductive wires may be provided to provide power to downhole electronics and/or to apply power to a tractor to pull the cable structure 2000 into a well. The metal tube 2004 and its insulation and the groups 2014-1 and 2014-2 of electrically conductive wires and their respective insulation can be held together by a wrapping tape 2028. The wrapping tape 2028 can be disposed in an outer metal tube 2007. In a non-limiting example, the wrapping tape 2028 may be 0.05 mm thick, the optical fibers 2002-1, 2002-2, 2002-3, and 2002-4 may be 2.4 mm fibers in a metal tube (FIMT), the insulation 2023-1 and 2023-2 may be 1.8 mm insulation around the groups 2014-1 and 2014-2 of electrically conductive wires; and the outer metal tube may be a 0.25 inch tube with wall thickness (WT) of 0.035 inches.

FIGS. 17-20 provide examples of optical fibers in a tube with the optical fibers arranged with single handed helix deployment. In addition, one or more elements of a cable structure discussed with respect to a figure of the group of FIGS. 17-20 may be used in a cable structure of the other figures of the group. Embodiments of optical fibers in a tube with the optical fibers arranged with single handed helix deployment are not limited to the arrangements illustrated in FIGS. 17-20.

The techniques, as taught herein, may also be used to create a cable with consistent and tight helix for DAS signal enhancement and directionality improvement. In order to improve optical fiber reliability and control macrobend loss, the ID of the tube can be larger than the typical 2.8 min ID tube. A tight wrap helix can have a helix angle of 20 degrees, 30 degrees, 45 degrees, or even higher. A larger ID tube will enable a larger optical fiber bend radius for a desired helix angle. Effective optical fiber bend radii for a number of larger ID conventional tubes are shown in Table 1 for a 45 degree helix angle.

TABLE 1

| Cable OD (in) | Wall thickness (in) | ID (in) | ID (mm) | Helix pitch (mm) | Effective bend radius of helix (mm) |
|---|---|---|---|---|---|
| 0.25 | 0.028 | 0.194 | 4.9 | 14.6 | 4.7 |
| 0.375 | 0.028 | 0.319 | 8.1 | 24.7 | 7.9 |
| 0.5 | 0.028 | 0.444 | 11.3 | 34.7 | 11.1 |
| 0.625 | 0.028 | 0.569 | 14.5 | 44.8 | 14.3 |

Given that the effective bend radius is relatively small, a bend resistant optical fiber should be used in order to keep macrobend loss to a minimum. In addition, the reliability of a standard diameter optical fiber (125 microns of glass) may not provide sufficient reliability under such a tight bend. A smaller diameter glass fiber, such as 100 microns or 80 microns can provide a substantial improvement in the reliability at these bend radiuses.

In various embodiments, twist imparted on an optical fiber can be varied along the cable length, enabling sections of the cable to have a higher angle helix and thus higher sensitivity than other parts of the cable. For example, increasing optical fiber rotations for a period of time can create a localized high angle helix (like a coil), providing localized signal enhancement and directionality for DAS, and higher spatial resolution for DTS. Alternatively, EFL can be varied along the cable, from well head exit to well toe, in a manner such that it is matched to the expected cable elongation caused by temperature and mechanical forces. The expected cable elongation caused by temperature and mechanical forces may be generated by modeling and simulation.

Figure 21:
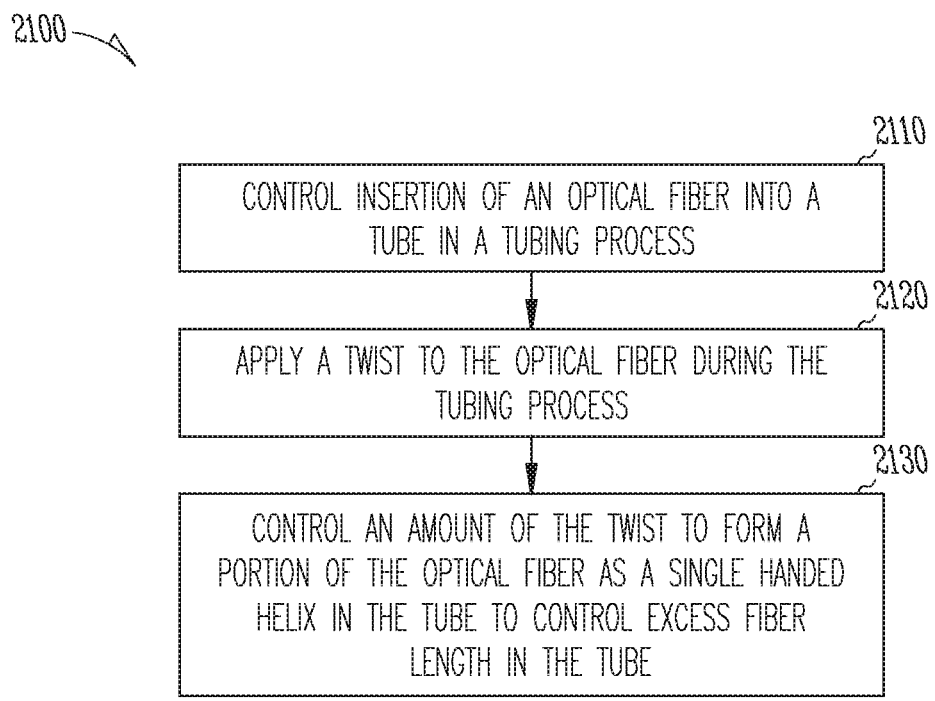
FIG. 21 is a flow diagram of elements of an example method of placing an optical fiber in a tube, in accordance with various embodiments.

FIG. 21 is a flow diagram of elements of an embodiment of an example method 2100 of placing an optical fiber in a tube. The tube may be a cable. Optical fiber cables constructed in such a manner can be employed in monitoring and measuring properties of a wellbore. At 2110, insertion of an optical fiber into a tube is controlled in a tubing process. At 2120, a twist is applied to the optical fiber during the tubing process. Applying the twist to the optical fiber can include rotating a fiber spool during the tubing process, the fiber spool containing the optical fiber being inserted into the tube. The insertion of the optical fiber into the tube can include pumping the optical fiber into the tube in the insertion of the optical fiber into the tube. Applying the twist to the optical fiber can include rotating a fiber spool containing the optical fiber, and re-spooling the optical fiber from the fiber spool onto a second fiber spool in the tubing process such that the optical fiber is pre-twisted on the second fiber spool from which the optical fiber is inserted into the tube. Insertion of the optical fiber from the second fiber spool can include pumping the optical fiber into the tube. Insertion of the optical fiber from the second fiber spool can include other techniques to place the optical fiber into the tube.

At 2130, an amount of the twist is controlled to form a portion of the optical fiber as a single handed helix in the tube to control excess fiber length in the tube. Controlling the amount of the twist can include mounting a cable spool, containing the optical fiber, sideways with respect to direction of the tube and pulling the optical fiber off the cable spool in the direction of the tube and into the tube. In some embodiments, with the cable spool mounted sideways, the insertion of the optical fiber into the tube can include pumping the optical fiber into the tube.

Variations of method 2100 or methods similar to method 2100 can include a number of different embodiments that may or may not be combined depending on the application of such methods and/or the architecture of systems in which such methods are implemented. Such methods can include increasing fiber rotations for a period of time to create a localized high angle helix. Such methods can include inserting one or more additional optical fibers into the tube, each additional optical fiber inserted with a controlled amount of twist. Such methods can include forming the optical fiber as a single handed helix coaxial in a retrievable wireline cable, forming the optical fiber as a single handed helix, helically wound with other core elements in a retrievable wireline cable, forming the optical fiber as a single handed helix coaxial in a cable in a permanent installation, forming the optical fiber as a single handed helix in a slickline application, or forming the optical fiber as a single handed helix, helically wound with other core elements in a cable in a permanent installation.

Variations of method 2100 or methods similar to method 2100 can include varying twist imparted on the optical fiber along a length of the tube such that sections of the optical fiber have a higher angle helix than other parts of the optical fiber. Such methods can include controlling excess fiber length in the tube such that the excess fiber length is matched to an expected tube elongation caused by temperature and mechanical forces in the deployed tube.

Optical fibers placed in tubes using techniques as taught herein can provide a path to a less expensive cable with higher performance than currently available. These techniques are ideal for use with a low cost thick wall single tube process, where an optical fiber is welded directly into, for example, a thick wall W' outer diameter (OD) cable.

Controlling optical fiber deployment in a single handed helix makes the single thick wall tube process practical. Single thick wall tube has a larger ID than conventional tube in tube design and so optical fiber deployment needs to be controlled, otherwise there is a risk of tight bends and kinks in the optical fiber. Optical fiber deployment, once set to single handed helix by optical fiber twist, can be maintained by applying gel in like pattern to the helix.

Figure 22:
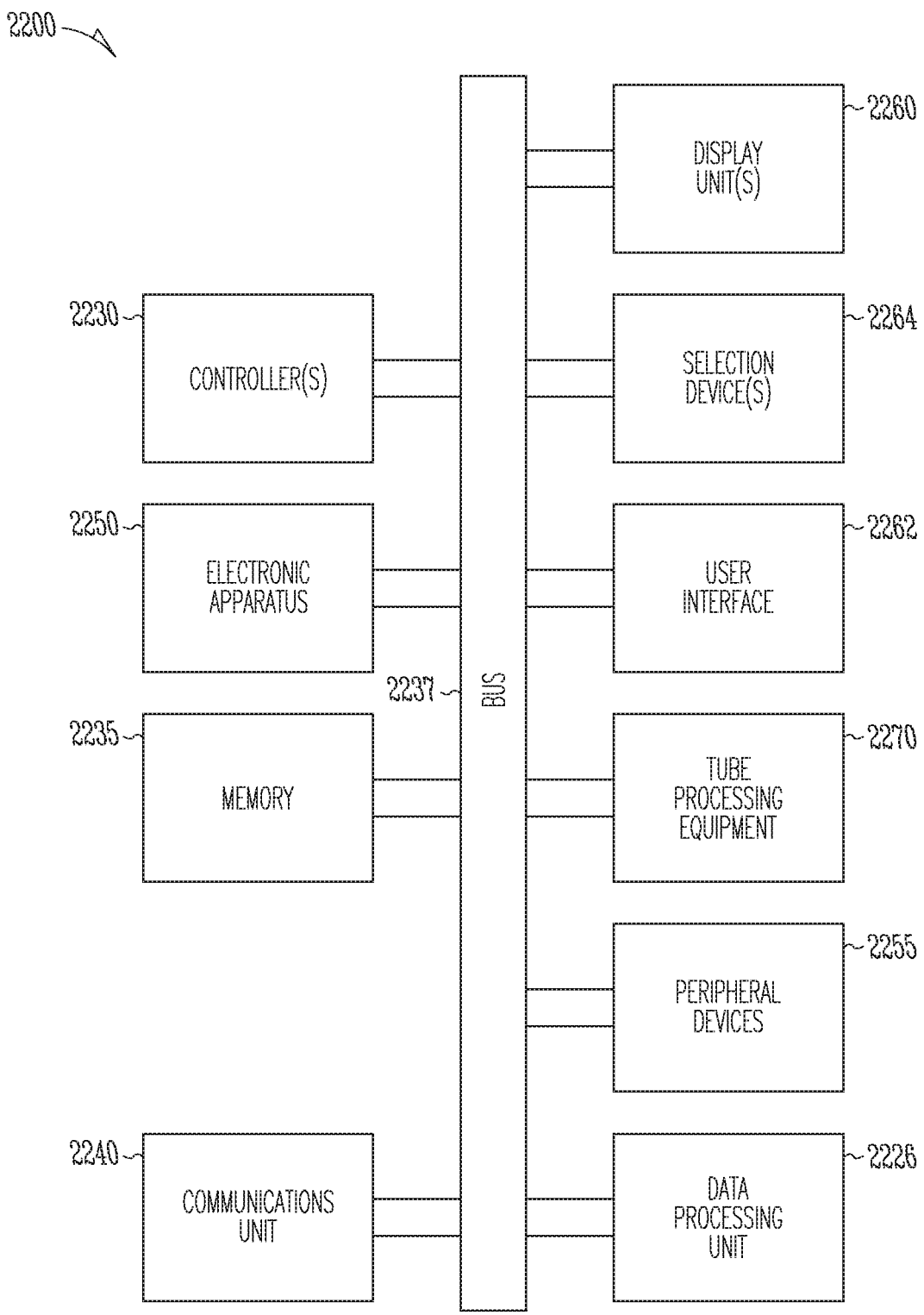
FIG. 22 is a block diagram of features of an example system operable to execute schemes associated with control of excess optical fiber deployment in a tube in a tubing process, in accordance with various embodiments.

FIG. 22 is a block diagram of features of an embodiment of an example system 2200 operable to execute schemes associated with control of excess optical fiber deployment in a tube in a tubing process. The system 2200 can comprise tube processing equipment 2270 to form a portion of an optical fiber as a single handed helix in a tube to control excess fiber length in the tube. The tube processing equipment 2270 can include fiber spools arranged with fiber spool rotators and/or fiber spool mounts as taught herein, for example, in accordance with embodiments described with respect to FIGS. 10-16 or similar arrangements.

The system 2200 can comprise controller(s) 2230 to control insertion of an optical fiber into a tube in a tubing process that uses the tube processing equipment 2270. The controller(s) 2230 can be arranged to control rotation of fiber spools and/or fiber spool rotators and movement of the fiber spools relative to the fiber spool rotators and/or fiber spool mounts. The controller(s) 2230 can be realized as one or more processors. The controller(s) 2230 can be arranged as a single processor or a group of processors. Processors of the group of processors may operate independently depending on an assigned function. The controller(s) 2230 can be realized as one or more application-specific integrated circuits (ASICs). The controller(s) 2230 can be realized as control circuitry to manage the components of system 2200.

The controller(s) 2230 can be operable to select an insertion technique from a group of insertion techniques including welding of the optical fiber into the tube, propelling the optical fiber inside the tube based on fluid drag, and pulling the optical fiber forward using a stopper/flow restriction. The controller(s) 2230 can operate with a pump to insert the optical fiber into the tube based on fluid drag. The controller(s) 2230 can be operable to select an amount of twist to apply to an optical fiber in the tubing process controlled by the system 2200. The optical fiber can be inserted in a tube of a cable. After inserting the optical fiber in the cable, the optical fiber can be disposed as a single handed helix coaxial in a retrievable wireline cable, as a single handed helix, helically wound with other core elements in a retrievable wireline cable, as a single handed helix coaxial in a cable in a permanent installation, as a single handed helix in a slickline application, or as a single handed helix, helically wound with other core elements in a cable in a permanent installation. Such an optical fiber can have excess fiber length in the cable of 1% or greater. The single handed helix has a helix angle of 45 degrees or higher. The optical fiber can be arranged as a sensing element in a distributed acoustic sensing system.

The system 2200 can include a user interface 2262 operable with the controller(s) 2230, a data processing unit 2226 operable with the user interface 2262, where the controller(s) 2230, the user interface 2262, and the data processing unit 2226 can be structured to be operated according to any scheme similar to or identical to the schemes associated with operating the tube processing equipment 2270 to control of excess optical fiber deployment in a tube in a tubing process as taught herein. The system 2200 can be arranged as a distributed system.

The system 2200 can include a memory 2235, an electronic apparatus 2250, and a communications unit 2240. The controller(s) 2230, the memory 2235, and the communications unit 2240 can be arranged to operate as a processing unit to control excess optical fiber deployment in a tube in a tubing process. The memory 2235 can be realized as a memory module, which may include a set of memory devices and access devices to interface with the set of memory devices. The memory 2235 can include a database having information and other data such that the system 2200 can operate on data to control excess optical fiber deployment in a tube in a tubing process. In an embodiment, the data processing unit 2226 can be distributed among the components of the system 2200 including memory 2235 and/or the electronic apparatus 2250. The electronic apparatus 2250 can include drivers to provide voltage and/or current input to the tube processing equipment 2270 and circuitry to handle signals from the tube processing equipment 2270.

The communications unit 2240 may use combinations of wired communication technologies and wireless technologies at appropriate frequencies. The communications unit 2240 can allow for a portion or all of data analysis regarding the status of a tubing process to be provided to the user interface 2262 for presentation on the one or more display unit(s) 2260 aboveground. The communications unit 2240 can allow for transmission of commands to the tube processing equipment 2270 in response to signals provided by a user through the user interface 2262.

The system 2200 can also include a bus 2237, where the bus 2237 provides electrical conductivity among the components of the system 2200. The bus 2237 can include an address bus, a data bus, and a control bus, each independently configured. The bus 2237 can be realized using a number of different communication mediums that allows for the distribution of components of the system 2200. Use of the bus 2237 can be regulated by the controller(s) 2230. The bus 2237 can include a communications network to transmit and receive signals including data signals and command and control signals. In a distributed architecture, the bus 2237 may be part of a communications network.

In various embodiments, peripheral devices 2255 can include additional storage memory and/or other control devices that may operate in conjunction with the controllers(s) 2230 and/or the memory 2235. The display unit(s) 2260 can be arranged with a screen display as a distributed component that can be used with instructions stored in the memory 2235 to implement the user interface 2262 to manage the operation of the tube processing equipment 2270 and/or components distributed within the system 2200. Such a user interface can be operated in conjunction with the communications unit 2240 and the bus 2237. The display unit(s) 2260 can include a video screen, a printing device, or other structure to visually project data/information and images. The system 2200 can include a number of selection devices 2264 operable with the user interface 2262 to provide user inputs to operate the data processing unit 2226 or its equivalent. The selection device(s) 2264 can include one or more of a touch screen, a computer mouse, or other control device operable with the user interface 2262 to provide user inputs to operate the data processing unit 2226 or other components of the system 2200.

Techniques as taught herein enable lower cost due to fewer manufacturing steps. Reducing to a single tubing step, eliminates the need for the conventional small tube line, since these techniques can be implemented using only a thick wall tube line. Time and materials associated with small tube step are also eliminated. Fewer steps can lead to fewer points of failure, which should support higher yield.

Techniques as taught herein enable lower cost due to higher capability to meet requirements. One of the major causes of poor cable performance is macro bend loss, which may be addressed by these techniques. Cable manufactures in conventional approaches do not have good yield, leading to cable remakes which costs enter into their pricing. Yield improvement enabled by these techniques can lead to cable cost reductions.

Controlled single handed helix in a relatively large ID, as attainable with the techniques as taught herein, may also provide optical and mechanical performance improvements. This can, in turn, improve DAS and DTS data quality over conventional cables that display bend loss. Microbending and macrobending loss can be reduced due to elimination of reversals. Microbending and macrobending loss can be reduced due to ability to use larger ID in a single tube with resulting lower radius of curvature for an optical fiber in a helix configuration. The amount of EFL in cables over conventional optical fiber in cables can be substantially increased, allowing for cable lengthening needed for retrievable cables without putting optical fiber under tension. This capability of reducing the impact of tension can provide increased reliability and performance for retrievable cables.

Controlled single handed helix in a relatively large ID, as attainable with the techniques as taught herein, may also enable sections of the cable to have higher sensitivity than other parts of the cable. This selectivity of sensitivity can enable high sensitivity DAS measurements in low signal applications such as flow monitoring. This selectivity of sensitivity can enable high spatial resolution DTS measurements The following are example embodiments of methods, systems, and machine readable storage devices, in accordance with the teachings herein.

A method 1 can comprise controlling insertion of an optical fiber into a tube in a tubing process; applying a twist to the optical fiber during the tubing process; and controlling an amount of the twist to form a portion of the optical fiber as a single handed helix in the tube to control excess fiber length in the tube.

A method 2 can include elements of method 1 and can include applying the twist to the optical fiber to include rotating a fiber spool during the tubing process, the fiber spool containing the optical fiber being inserted into the tube.

A method 3 can include elements of any of methods 1 and 2 and can include the insertion of the optical fiber into the tube to include pumping the optical fiber into the tube in the insertion of the optical fiber into the tube.

A method 4 can include elements of method 2 and elements of any of methods 1 and 3 and can include increasing fiber rotations for a period of time to create a localized high angle helix.

A method 5 can include elements of any of methods 1-4 and can include controlling the amount of the twist to include mounting a cable spool, containing the optical fiber, sideways with respect to direction of the tube and pulling the optical fiber off the cable spool in the direction of the tube and into the tube.

A method 6 can include elements of method 5 and can include the insertion of the optical fiber into the tube to include pumping the optical fiber into the tube.

A method 7 can include elements of any of methods 1-6 and can include applying the twist to the optical fiber to include rotating a fiber spool containing the optical fiber, and re-spooling the optical fiber from the fiber spool onto a second fiber spool in the tubing process such that the optical fiber is pre-twisted on the second fiber spool from which the optical fiber is inserted into the tube.

A method 8 can include elements of any of methods 1-7 can include insertion of the optical fiber from the second fiber spool to include pumping the optical fiber into the tube.

A method 9 can include elements of any of methods 1-8 and can include inserting one or more additional optical fibers into the tube, each additional optical fiber inserted with a controlled amount of twist.

A method 10 can include elements of any of methods 1-9 and can include forming the optical fiber as a single handed helix coaxial in a retrievable wireline cable, forming the optical fiber as a single handed helix, helically wound with other core elements in a retrievable wireline cable, forming the optical fiber as a single handed helix coaxial in a cable in a permanent installation, forming the optical fiber as a single handed helix in a slickline application, or forming the optical fiber as a single handed helix, helically wound with other core elements in a cable in a permanent installation.

A method 11 can include elements of any of methods 1-10 and can include varying twist imparted on the optical fiber along a length of the tube such that sections of the optical fiber have a higher angle helix than other parts of the optical fiber.

A method 12 can include elements of any of methods 1-11 and can include controlling excess fiber length in the tube such that the excess fiber length is matched to an expected tube elongation caused by temperature and mechanical forces in the deployed tube.

A system 1 can comprise a cable operable downhole in a well bore; and an optical fiber disposed as a single handed helix in the cable, the optical fiber disposed in the cable without helix hand reversal.

A system 2 can include elements of system 1 and can include the optical fiber disposed as a single handed helix coaxial in a retrievable wireline cable, as a single handed helix, helically wound with other core elements in a retrievable wireline cable, as a single handed helix coaxial in a cable in a permanent installation, as a single handed helix in a slickline application, or as a single handed helix, helically wound with other core elements in a cable in a permanent installation.

A system 3 can include elements of any of systems 1 and 2 and can include the optical fiber having excess fiber length in the cable of 1% or greater.

A system 4 can include elements of any of systems 1-3 and can include the single handed helix has a helix angle of 45 degrees or higher.

A system 5 can include elements of any of systems 1-4 and can include the optical fiber being arranged as a sensing element in a distributed acoustic sensing system.

A system 6 can comprise a controller operable to control insertion of an optical fiber into a tube in a tubing process; and a fiber spool rotator operatively coupled to the controller, the fiber spool rotator structured to rotate a fiber spool containing the optical fiber.

A system 7 can include elements of system 6 and can include a pump to insert the optical fiber into the tube based on fluid drag.

A system 8 can include elements of any of systems 6 and 7 and can include the controller being operable to select an insertion technique from a group of insertion techniques including welding of the optical fiber into the tube, propelling the optical fiber inside the tube based on fluid drag, and pulling the optical fiber forward using a stopper/flow restriction.

A system 7 can include elements of any of systems 6-8 and can include the controller being operable to select an amount of twist to apply to the optical fiber in the tubing process.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
controlling insertion of an optical fiber into a tube in a tubing process;
applying a twist to the optical fiber during the tubing process;
controlling an amount of the twist to form a portion of the optical fiber as a single handed helix in the tube to control excess fiber length in the tube; and
at least one of forming an optical fiber as a single handed helix coaxial in a retrievable wireline cable, forming the optical fiber as a single handed helix, helically wound with other core elements in a retrievable wireline cable, forming the optical fiber as a single handed helix coaxial in a cable in a permanent installation, forming the optical fiber as a single handed helix helix, helically wound with other core elements in a cable in a permanent installation.

2. The method of claim 1, wherein applying the twist to the optical fiber includes rotating a fiber spool during the tubing process, the fiber spool containing the optical fiber being inserted into the tube.

3. The method of claim 2, wherein the insertion of the optical fiber into the tube includes pumping the optical fiber into the tube in the insertion of the optical fiber into the tube.

4. The method of claim 2, wherein the method includes increasing fiber rotations for a period of time to create a localized high angle helix.

5. The method of claim 1, wherein controlling then amount of the twist includes mounting a cable spool, containing the optical fiber, sideways with respect to direction of the tube and pulling the optical fiber off the cable spool in the direction of the tube and into the tube.

6. The method of claim 5, wherein the insertion of the optical fiber into the tube includes pumping the optical fiber into the tube.

7. The method of claim 1, wherein applying the twist to the optical fiber includes rotating a fiber spool containing the optical fiber, and re-spooling the optical fiber from the fiber spool onto a second fiber spool in the tubing process such that the optical fiber is pre-twisted on the second fiber spool from which the optical fiber is inserted into the tube.

8. The method of claim 7, wherein, insertion of the optical fiber from the second fiber spool includes pumping the optical fiber into the tube.

9. The method of claim 1, wherein the method includes inserting one or more additional optical fibers into the tube, each additional optical fiber inserted with a controlled amount of twist.

10. The method of claim 1, wherein the method includes varying twist imparted on the optical fiber along a length of the tube such that sections of the optical fiber have a higher angle helix than other parts of the optical fiber.

11. The method of claim 1, wherein the method includes controlling excess fiber length in the tube such that the excess fiber length is matched to an expected tube elongation caused by temperature and mechanical forces in the deployed tube.

* * * * *

UNITED STATES PATENT AND TRADEMARK OFFICE
CERTIFICATE OF CORRECTION

PATENT NO. : 10,795,109 B2  
APPLICATION NO. : 16/316338  
DATED : October 6, 2020  
INVENTOR(S) : Benjamin et al.

Page 1 of 1

It is certified that error appears in the above-identified patent and that said Letters Patent is hereby corrected as shown below:

In the Claims

Column 16, Line 15, Claim 1:
"forming the optical fiber as a single handed helix helix, helically wound with other core elements in a cable in a permanent installation.."
Should read:
".....or forming the optical fiber as a single handed helix, helically wound with other core elements in a cable in a permanent installation."

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*